(12) United States Patent
You et al.

(10) Patent No.: US 11,212,604 B2
(45) Date of Patent: Dec. 28, 2021

(54) SPEAKER QUICK MOUNT STRUCTURE AND QUICK MOUNT ASSEMBLY

(71) Applicant: Ningbo Lumiaudio Electronic Technology Ltd., Zhejiang (CN)

(72) Inventors: Xiaodong You, Zhejiang (CN); Jun Tang, Zhejiang (CN)

(73) Assignee: Ningbo Lumiaudio Electronic Technology Ltd.

( * ) Notice: Subject to any disclaimer, the term of this patent is extended or adjusted under 35 U.S.C. 154(b) by 0 days.

(21) Appl. No.: 16/570,341

(22) Filed: Sep. 13, 2019

(65) Prior Publication Data

US 2020/0107089 A1 Apr. 2, 2020

(30) Foreign Application Priority Data

Sep. 30, 2018 (CN) .......................... 201821610669.2

(51) Int. Cl.
*H04R 1/02* (2006.01)
*F16B 45/04* (2006.01)

(52) U.S. Cl.
CPC ............. *H04R 1/026* (2013.01); *F16B 45/04* (2013.01); *H04R 2201/021* (2013.01)

(58) Field of Classification Search
CPC .... H04R 1/025; H04R 1/02; H04R 2201/029; H04R 2201/021; H04R 1/026; F21V 21/047; F16B 9/023
USPC ............................ 381/368, 87, 182, 386, 387
See application file for complete search history.

(56) References Cited

U.S. PATENT DOCUMENTS

| | | | |
|---|---|---|---|
| 9,479,852 B2 | 10/2016 | Yang et al. | |
| 10,024,493 B2 | 7/2018 | Hart | |
| 10,171,897 B2 | 1/2019 | Hart | |
| 2010/0040254 A1* | 2/2010 | Wright | H04R 1/02 381/395 |
| 2015/0271578 A1* | 9/2015 | Marcum | H04R 1/02 381/395 |
| 2016/0241940 A1* | 8/2016 | Yang | H04R 1/026 |
| 2016/0366501 A1* | 12/2016 | Ivey | H04R 1/026 |

* cited by examiner

*Primary Examiner* — Alexander Krzystan
*Assistant Examiner* — Julie X Dang
(74) *Attorney, Agent, or Firm* — Design IP

(57) ABSTRACT

A speaker fast mounting assembly and a method of use. The loudspeaker fast mounting assembly includes: a pressing edge; a locking and releasing assembly comprising a fixed support and a sliding and limiting piece, the fixed bracket is provided on the sliding and limiting piece of the locking position and the release position, the locking position and the release position is arranged between the channel, the sliding and limiting piece sliding fit in the channel; the pressing block, the pressing block is connected to the slide and on the limiting piece, the briquetting of the press with the pressure-side member of the fixture; the elastic member, the elastic member so that the block and the pressure-side member to maintain the pressing state; the unlocking member used for the sliding and limiting piece are balanced in order to make the sliding and limiting piece from the self-locking position.

12 Claims, 7 Drawing Sheets

SPEAKER QUICK MOUNT STRUCTURE AND QUICK MOUNT ASSEMBLY

FIELD OF THE INVENTION

The present invention relates to the speaker technology field, to be specific, a speaker quick mount assembly and structure.

BACKGROUND OF THE INVENTION

When mounting an in-ceiling or in-wall speaker, the installer must first cut out a hole in the substrate, normally a ceiling or wall, and recess the speaker into the hole, and then fix the speaker to the substrate using screws or other mounting accessories and devices. When uninstalling the speaker, the installer must loosen and remove the screw and any other devices used to hold the speaker on the substrate. Once these devices are removed the installer can remove the speaker from the cut-out hole. The existing mounting technology has the following disadvantages: overly time consuming as removal and installation requires the appropriate tools, additional training and knowledge to remove or install the speaker requiring more time and training costs.

SUMMARY OF THE INVENTION

The present invention is to provide a speaker quick mount assembly and structure that improves the mounting/dismounting efficiency, time-saving and reduced effort.

The invention provides a loudspeaker quick mount assembly, the quick mount assembly comprising: an outer flange, a lock and unlock assembly, including a support assembly and a slide and limit member, wherein the support assembly is provided with a blocking position and a release position for accommodating the slide and limit member. A path guide is provided between the blocking position and the release position, and the slide and limit member is located in the path guide. A tab fixed to the slide and limit member works with the outer flange to press a substrate; an elastic member keeps the tab and the outer flange in a pressed state; and a release member abuts the slide and limit member to disengage the slide and limit member from the blocking position.

In one embodiment, the support assembly comprises a first support member and a second support member. The blocking position, the release position and the path guide are all located on the first support member, and the two contact surfaces of the blocking position and the slide and limit member are flat.

In one embodiment, the support assembly and the slide and limit member are provided with a cavity, and the elastic member is located in the cavity. One end of the elastic member abuts the first support member, and the other end of the elastic member abuts the slide and limit member.

In one embodiment, one end of the elastic member is fixed to the support assembly, and the other end of the elastic member is fixed to the slide and limit member.

In another embodiment, a speaker quick mount structure comprises an inner flange for mounting the speaker and a plurality of speaker quick mount assemblies mounted on the inner flange. Each of the speaker quick mount assemblies includes an outer flange positioned at the outer margin of the inner flange and a lock and unlock assembly positioned on the inner flange. The lock and unlock assembly includes a support assembly and a slide and limit member, wherein the support assembly is provided with a blocking position and an release position for accommodating the slide and limit member. A path guide is provided between the blocking position and the release position, and the slide and limit member is located in the path guide.

A tab, which is fixed to the slide and limit member, works with the outer flange to press a substrate. An elastic member keeps the first support member away from the slide and limit member. A release member is slidably engaged with the inner flange, the release member is used to abut against the slide and limit member to disengage the slide and limit member from the blocking position.

The support assembly comprises a first support member and a second support member. The blocking position, the release position and the path guide are all located on the first support member; and the two contact surfaces of the blocking position and the slide and limit member are flat.

In one embodiment, the support assembly and the slide and limit member are provided with a cavity, and the elastic member is located in the cavity. One end of the elastic member abuts the first support member, and the other end of the elastic member abuts the slide and limit member.

In one embodiment, one end of the elastic member is fixed to the support assembly, and the other end of the elastic member is fixed to the slide and limit member.

In one embodiment, the inner flange is provided with a first channel, the release member is fitted in the first channel. One end of the release member is used for an installer to push, and the other end abuts the slide and limit member.

In one embodiment, a limit slot is positioned in the first channel, and a limit tab is provided on the release member to use together with the limit slot. The limit tab is fitted in the limit slot.

In one embodiment, the slide and limit member is provided with a notch, and an actuate tab located on the release member is slidably engaged with the notch.

The release member and the second support member are both provided with a second channel. The lock and unlock assembly can be pushed through the second channel.

By adopting the said assembly and structure, the present invention has below advantages as compared to the existing technology. Mounting can be easily completed by pressing a number of release members, and dismounting can be quickly completed by using a small pillar shaped device to press the slide members. The whole process is quick and labor-saving.

DETAILED DESCRIPTION

Figure 1:
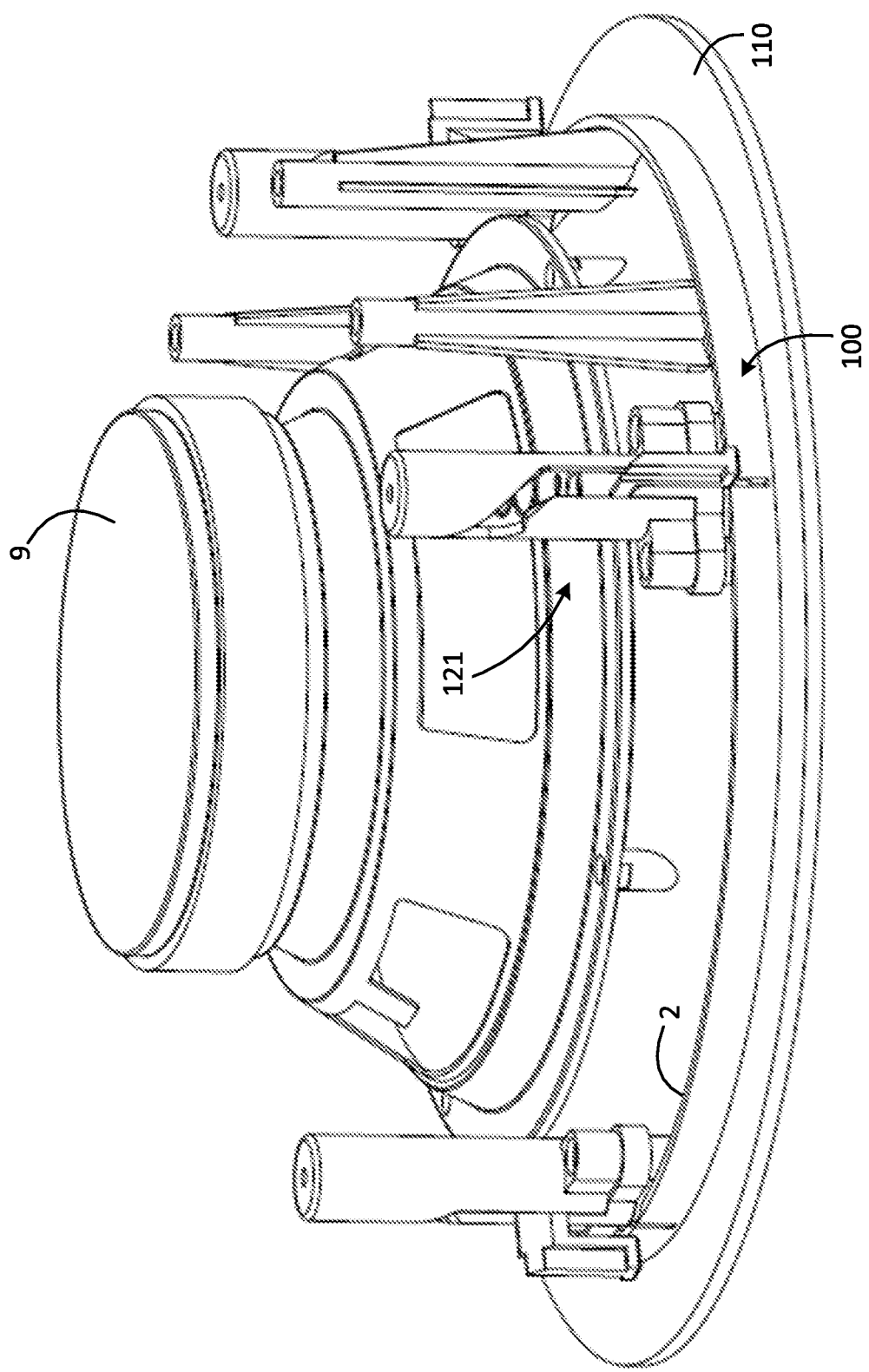
FIG. 1 is a line drawing of the speaker quick mount structure.
Figure 2:
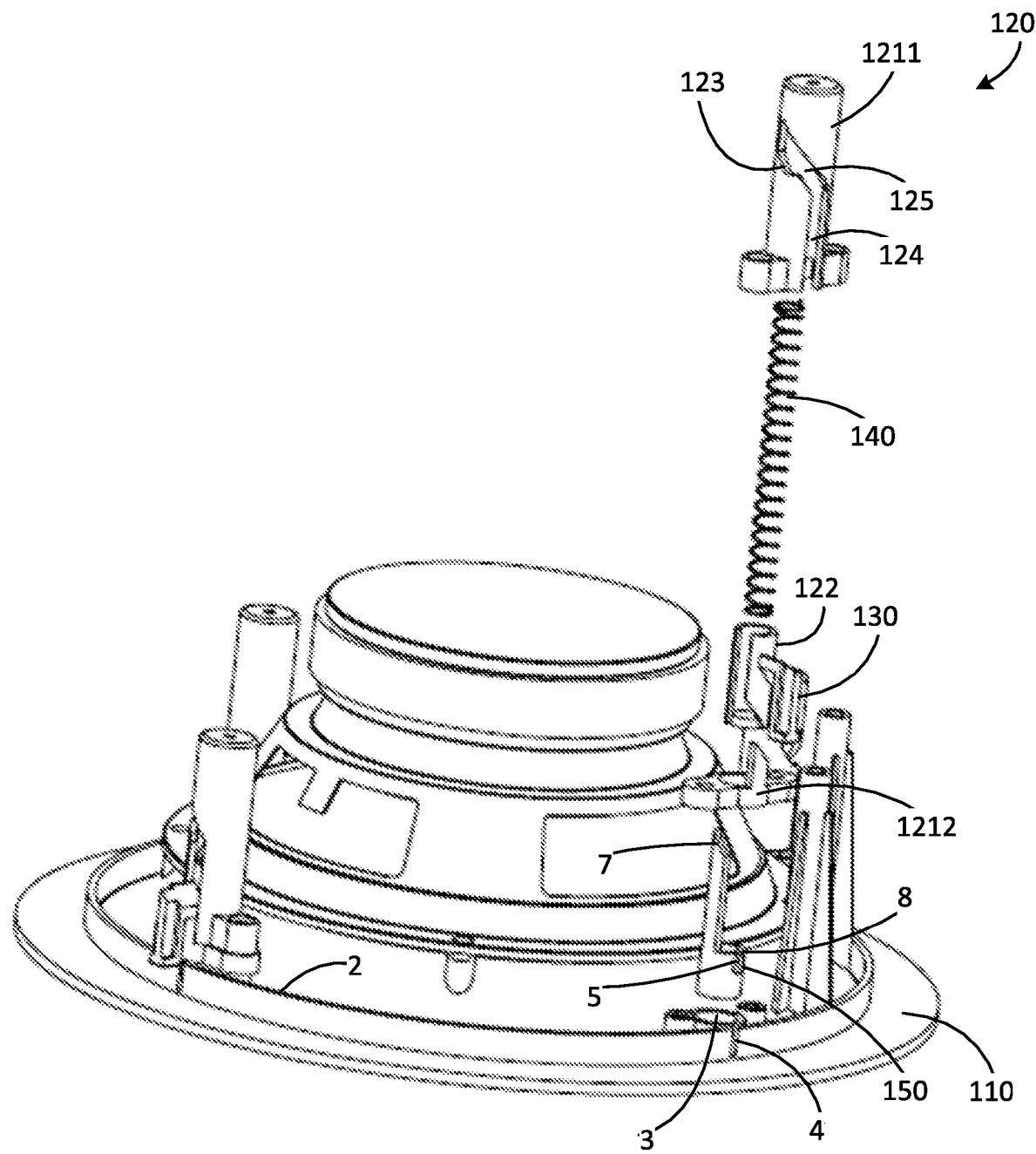
FIG. 2 is an exploded diagram of the structure from the first view.
Figure 3:
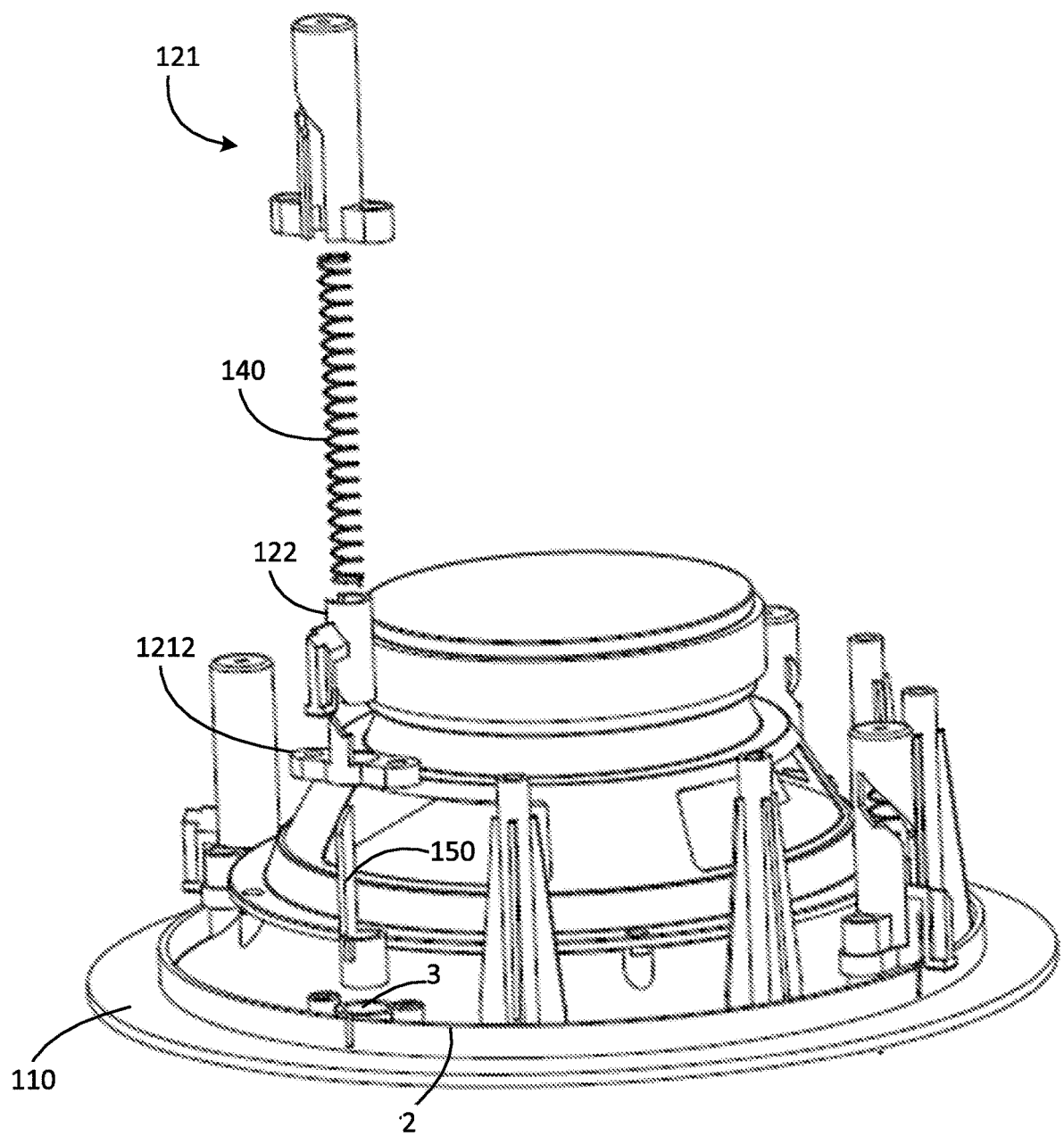
FIG. 3 is an exploded diagram of the structure from the second view.
Figure 4:
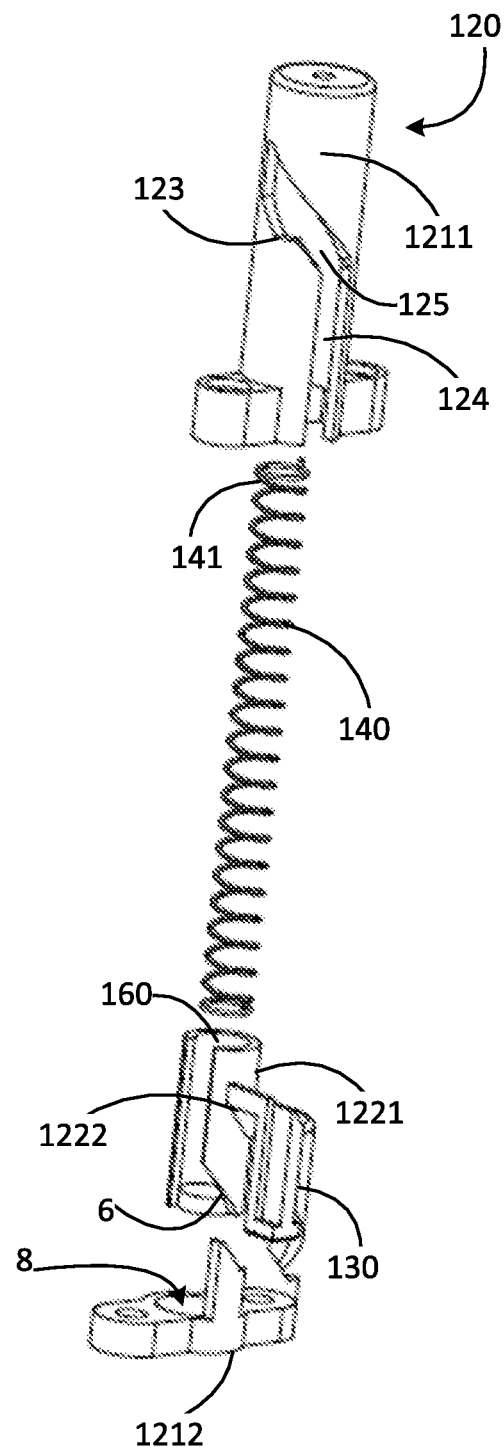
FIG. 4 is an exploded diagram of the assembly.
Figure 5:
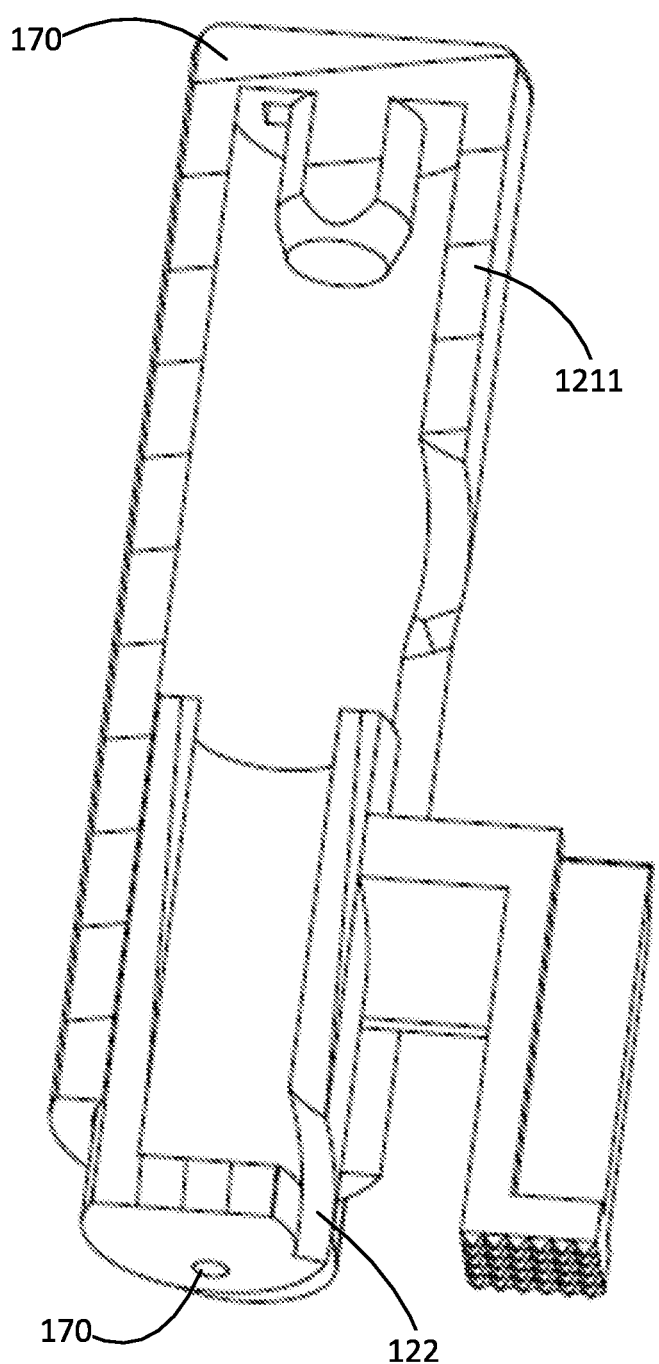
FIG. 5 is a sectional view of the first support member and limit member.
Figure 6B:
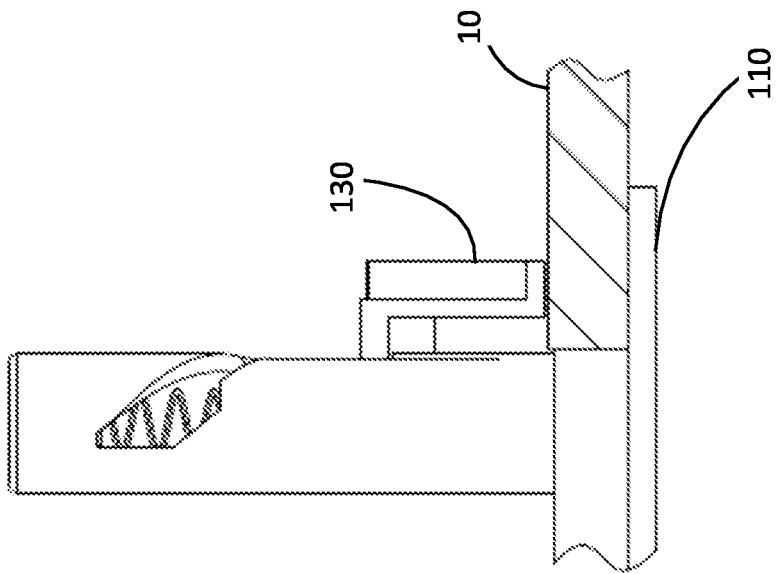
FIG. 6B is a diagram showing the assembly of FIG. 6A in a release position.
Figure 6A:
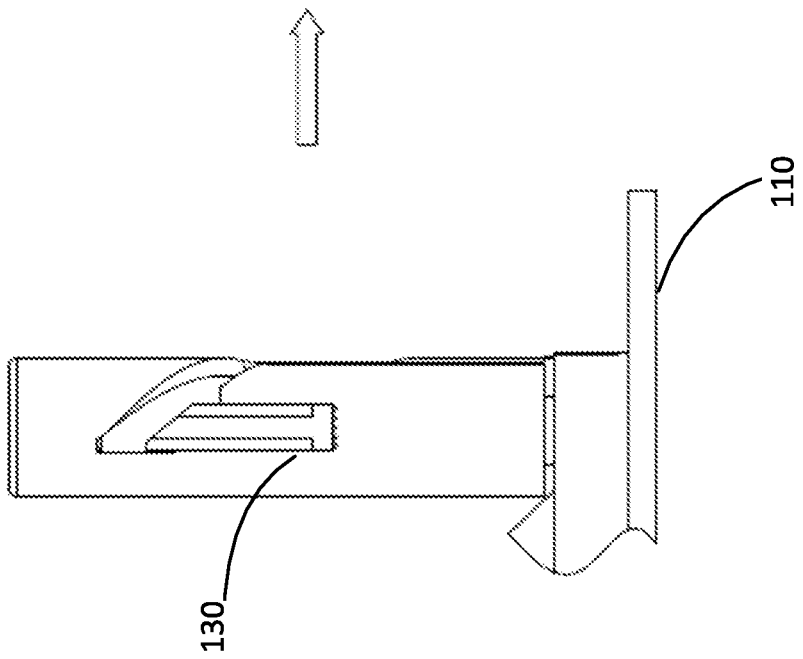
FIG. 6A is a diagram showing the assembly in a block position.

A preferred embodiment of the present invention will be described hereinafter with reference to the attached drawings.

As FIG. 1, FIG. 2, FIG. 3, FIG. 4, FIG. 5, FIG. 6A, and FIG. 6B show, the speaker quick mount assembly 100 comprises an outer flange 110; a lock and unlock assembly 120, comprising a support assembly 121 and a slide and limit member 122, wherein the support assembly 121 is provided with a blocking position 123 and a release position 124 for accommodating the slide and limit member 122. A path guide 125 is provided between the blocking position 123 and the release position 124, where the slide and limit member 122 is fitted in. In this embodiment, the slide and limit member 122 includes a slide member 1221 and a limit member 1222. The limit member 1222, connecting with the slide member 1221, has a flat bottom base and an arc or slant side. The blocking position 123 is located on a vertical passageway. The bottom of the vertical passageway can be flat, or an arc surface matching with the slide and limit member 122, or a combination of ramp and plane surface. The release position 124 is also located on a vertical passageway. The bottom of the vertical passageway can be flat, or an arc surface matching with the slide and limit member 122, or a combination of ramp and plane surface. The two vertical passageways are connected by the path guide 125.

The support assembly 121 comprises a first support member 1211 and a second support member 1212. The blocking position 123, the release position 124 and the path guide 125 are all located on the first support member 1211; the two contact surfaces of the blocking position 123 and the slide and limit member 122 are flat.

A tab 130, which is fixed to the slide and limit member 122, works with the outer flange 110 to press the substrate, such as sheetrock 10 or any other object that can bear the press of the tab 130 and the outer flange 110.

An elastic member 140 keeps the tab 130 and the outer flange 110 in a pressed state. In this embodiment, the elastic member 140 is a spring, it also can be a gas spring or any other elastic component.

A release member 150 abuts against the slide and limit member 122 to disengage the slide and limit member 122 from the blocking position 123, so that the slide and limit member 122 slip into the release position 124 through the path guide 125.

The facing surface of the tab 130 and the outer flange 110 are provided with the non-slip component, such as non-slip slot, non-slip tab or others. The tab 130 is connected to the limit member 1222.

The support assembly 121 and the slide and limit member 122 are provided with a cavity 160. The cavity 160 can be attached fully on the support assembly 121 or the slide and limit member 122, or the cavity 160 can be attached partially in the support assembly 121 or the slide and limit member 122. One end of the elastic member 140 abuts against the support assembly 121, the other end of the elastic member 140 abuts against the slide and limit member 122.

One end of the elastic member 140 is fixed to the support assembly 121, the other end of the elastic member 140 is fixed to the slide and limit member 122. In this embodiment, the fixed measure can be rivet, screw or others. A elastic member end 141 is located on both ends of the elastic member 140, an axle hole 170 is located on the support assembly 121 and the slide and limit member 122. The elastic member is circumferentially limited through the elastic member ends 141 and axle hole 170.

A speaker quick mount structure, wherein it comprises an inner flange 2 for mounting the speaker 9. In this embodiment, more outer flanges 110 can be fixed to the outer edge of the inner flange 2. Usually the outer flanges will join together to form a circle for aesthetics.

Several speaker quick mount assemblies 100, all are mounted on the inner flange 2, each of the speaker quick mount assemblies comprises an outer flange 110 is positioned at the outer margin of the inner flange 2.

A lock and unlock assembly 120 is positioned on the inner flange 2, comprises a support assembly 121 and a slide and limit member 122, wherein the support assembly 121 is provided with a blocking position 123 and a release position 124 for accommodating the slide and limit member 122. A path guide 125 is provided between the blocking position 123 and the release position 124, where the slide and limit member 122 is fitted in.

In this embodiment, the limit member 1222, connecting with the slide member 1221, has a flat bottom base and an arc or slant side. The blocking position 123 is located on a vertical passageway. The bottom of the vertical passageway can be flat, or an arc surface matching with the slide and limit member 122, or a combination of ramp and plane surface. The release position 124 is also located on a vertical passageway. The bottom of the vertical passageway can be flat, or an arc surface matching with the slide and limit member 122, or a combination of ramp and plane surface. The two vertical passageways are connected by an actuate pathway (refer to the path guide 125).

The support assembly 121 comprises a first support member 1211 and a second support member 1212. The blocking position 123, the release position 124 and the path guide 125 are all located on the first support member 1211; the two contact surfaces of the blocking position 123 and the slide and limit member 122 are flat.

A tab 130, which is fixed to the slide and limit member 122, works with the outer flange 110 to press the substrate such as sheetrock 10 or other object can bear the press of the tab 130 and the outer flange 110.

An elastic member 140 keeps the tab 130 and the outer flange 110 in a pressed state. In this embodiment, the elastic member 140 is a spring, it also can be a gas spring or any other elastic component.

A release member 150 is slidably engaged with the inner flange 2, the release member 150 is used to abut against the slide and limit member 122 to disengage the slide and limit member 122 from the blocking position 123, so that the slide and limit member 122 slip into the release position 124 through the path guide 125.

The inner flange 2 is provided with a first channel 3, the release member 150 is fitted in the first channel 3. One end of the release member 150 is used for the installer to push, and the other end abuts the slide and limit member 122.

A limit slot 4 is positioned in the first channel 3, and a limit tab 5 is provided on the release member 150 to use together with the limit slot 4. The limit tab 5 is slidably engaged in the limit slot 4 to prevent the release member 150 from dropping.

The slide and limit member 122 is provided with a notch 6, an actuate tab 7 is located on the release member 150 to work with the notch 6. The actuate tab 7 is slidably engaged with the notch 6.

The release member 150 and the second support member 1212 are both provided with a second channel 8. The lock and unlock assembly 120 can be pushed through the second channel 8.

The facing surface of the tab 130 and the outer flange 110 are provided with the non-slip component, such as non-slip slot, non-slip tab or others. The tab 130 is connected to the limit member 1222.

The support assembly 121 and the slide and limit member 122 are provided with a cavity 160. The cavity 160 can be attached fully on the support assembly 121 or the slide and limit member 122, or the cavity 160 can be attached partially in the support assembly 121 or the slide and limit member 122. One end of the elastic member 140 abuts against the support assembly 121, the other end of the elastic member 140 abuts against the slide and limit member 122.

One end of the elastic member 140 is fixed to the support assembly 121, and the other end of the elastic member 140 is fixed to the slide and limit member 122. In this embodiment, the fixed measure can be rivet, screw or others. A elastic member end 141 is located on both ends of the elastic member 140, an axle hole 170 is located on the support assembly 121 and the slide and limit member 122. The elastic member is circumferentially limited through the elastic member ends 141 and axle hole 170.

Figures 7A, 7B:
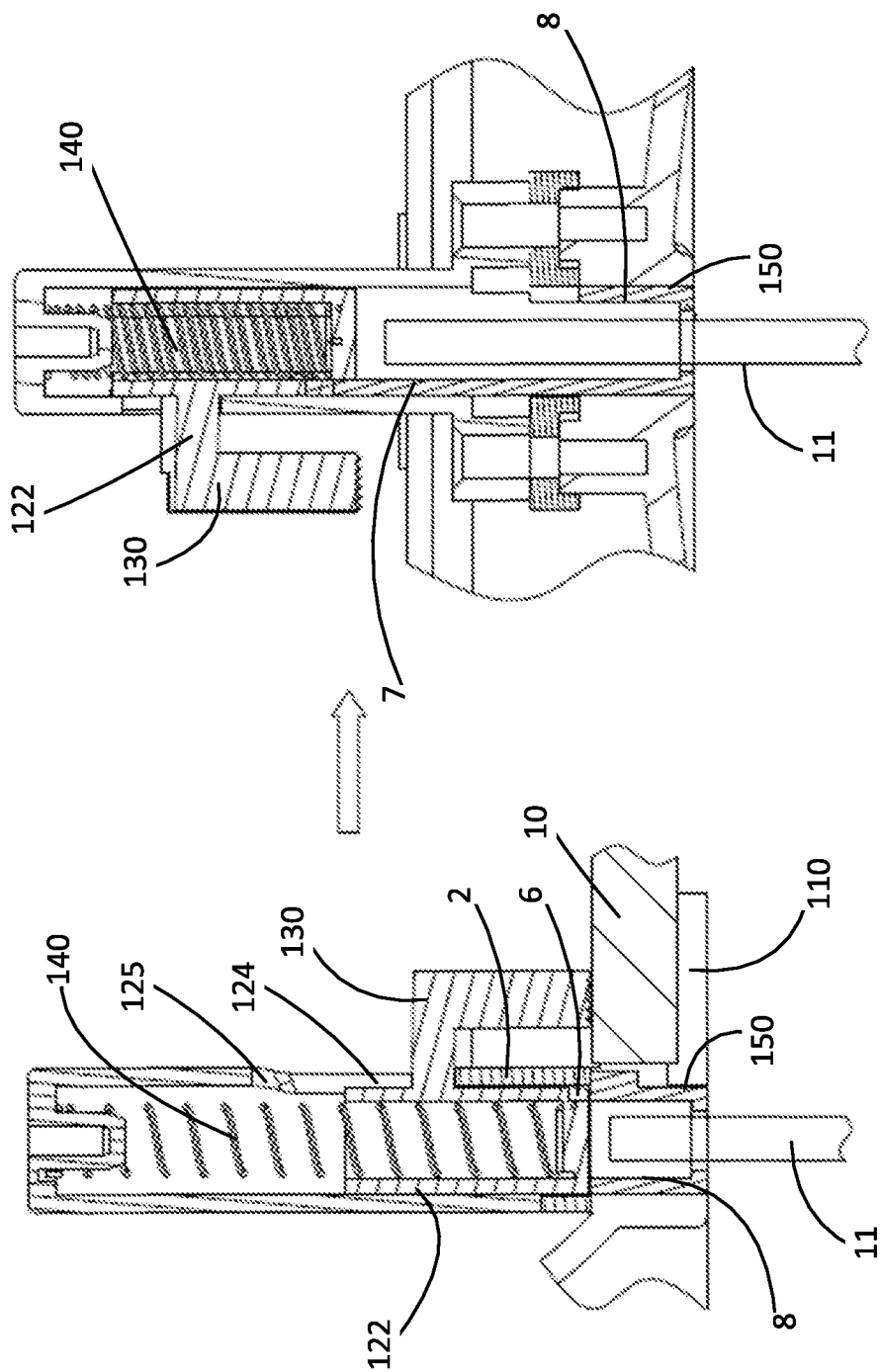
FIG. 7A is diagram showing the assembly in a release position.
FIG. 7B is diagram showing the assembly of FIG. 7A in a block position.

As seen in FIGS. 7A & 7B, when a speaker needs to be installed or removed, as the slide and limit member 122 is in the release position 124, a pillar device 11 can be used to push upward through the second channel 8, in this way, the slide and limit member 122 slip into the blocking position 123 via the path guide 125. When mounting, the installer must insert the inner flange 2 into the prepared hole, and then pushes the release member 150 by using a pillar device 11. The movement of the notch 6 and the actuate tab 7 work together to press the slide and limit member 122 beyond the path guide 125 before entering the release position 124 by virtue of the elastic member 140. Finally, the tab 130 and the outer flange 110 clamp the sheetrock 10 or any other substrate, and the mounting process is completed.

The foregoing detailed description has been given for understanding exemplary embodiments of the invention and no unnecessary limitations of the claims should be understood. The invention is not limited to embodiments described above, and its specific structure allows for variations. All changes which come within the meaning and range of equivalency of the claims are to be embraced within their scope.

The invention claimed is:

1. A speaker quick mount assembly, comprising:
   an outer flange;
   a lock and unlock assembly including a support assembly and a slide and limit member, wherein the support assembly is provided with a blocking position and a release position for accommodating the slide and limit member,
   a path guide provided between the blocking position and the release position, the slide and limit member being located within the path guide;
   a tab fixed to the slide and limit member, that is adapted to cooperate with the outer flange to press a substrate when the slide and limit member is in the blocking position;
   an elastic member that biases the tab and the outer flange press the substrate; and
   a release member that abuts the slide and limit member to disengage the slide and limit member from the blocking position, wherein the slide and limit member is provided with a notch, and an actuate tab located on the release member is slidably engaged with the notch.

2. The speaker quick mount assembly of claim 1, wherein the support assembly includes a first support member and a second support member, the blocking position, the release position and the path guide are all located on the support assembly; and two contact surfaces of the blocking position and the slide and limit member are flat.

3. The speaker quick mount assembly of claim 1, wherein the support assembly and the slide and limit member are provided with a cavity, the elastic member is located in the cavity, a first end of the elastic member abuts the support assembly, and a second end of the elastic member abuts the slide and limit member.

4. The speaker quick mount assembly of claim 1, wherein a first end of the elastic member is fixed to the support assembly, and a second end of the elastic member is fixed to the slide and limit member.

5. A speaker quick mount structure, comprising an inner flange for mounting a speaker and a plurality of quick mount assemblies mounted on the inner flange; each of the plurality of quick mount assemblies comprising:
   an outer flange positioned at an outer margin of the inner flange;
   a lock and unlock assembly positioned on the inner flange, wherein the lock and unlock assembly comprises a support assembly and a slide and limit member, wherein the support assembly is provided with a blocking position and a release position for accommodating the slide and limit member;
   a path guide provided between the blocking position and the release position, the slide and limit member being located within the path guide;
   a tab fixed to the slide and limit member that is adapted to cooperate with the outer flange to press a substrate;
   an elastic member that biases the support assembly away from the slide and limit member; and
   a release member that is slidably engaged with the inner flange, the release member abutting against the slide and limit member to disengage the slide and limit member from the blocking position, wherein the slide and limit member is provided with a notch, and an actuate tab located on the release member is slidably engaged with the notch.

6. The speaker quick mount structure of claim 5, wherein the support assembly includes a first support member and a second support member; the blocking position, the release position and the path guide are all located on the first support member, and two contact surfaces of the blocking position and the slide and limit member are flat.

7. The speaker quick mount structure of claim 5, wherein the support assembly and the slide and limit member are provided with a cavity, the elastic member is located in the cavity, a first end of the elastic member abuts the first support member, and a second end of the elastic member abuts the slide and limit member.

8. The speaker quick mount structure of claim 5, wherein a first end of the elastic member is fixed to the support assembly, and a second end of the elastic member is fixed to the slide and limit member.

9. The speaker quick mount structure of claim 5, wherein the inner flange is provided with a first channel, the release member is fitted in the first channel, a first end of the release member is used for a user to push, and a second end of the release member end abuts the slide and limit member.

10. The speaker quick mount structure of claim 9, wherein a limit slot is positioned in the first channel, and a limit tab is provided on the release member to use together with the limit slot, the limit tab being fitted in the limit slot.

11. The speaker quick mount structure of claim 5, wherein the release member and the second support member are both provided with a second channel; and wherein the lock and unlock assembly can be pushed through the second channel.

12. A speaker comprising:
   an outer flange;

at least one quick mount assembly, each of the quick-mount assemblies comprising:
- a lock and unlock assembly including a support assembly and a slide and limit member, wherein the support assembly is provided with a blocking position and a release position for accommodating the slide and limit member,
- a path guide provided between the blocking position and the release position, the slide and limit member being located within the path guide;
- a tab fixed to the slide and limit member, that is adapted to cooperate with the outer flange to press a substrate when the slide and limit member is in the blocking position;
- an elastic member that biases the tab and the outer flange press the substrate; and
- a release member that abuts the slide and limit member to disengage the slide and limit member from the blocking position, wherein the slide and limit member is provided with a notch, and an actuate tab located on the release member is slidably engaged with the notch.

\* \* \* \* \*